United States Patent [19]

Musil

[11] Patent Number: 5,244,088

[45] Date of Patent: Sep. 14, 1993

[54] SNAP APART RIVET HOLDER

[75] Inventor: Edward C. Musil, Lyons, Ill.

[73] Assignee: Flexible Steel Lacing Company, Downers Grove, Ill.

[21] Appl. No.: 869,519

[22] Filed: Apr. 16, 1992

[51] Int. Cl.$^5$ .......................... B65D 69/00; F16G 3/02
[52] U.S. Cl. ...................................... 206/338; 24/33 B
[58] Field of Search .................. 227/41, 43, 154, 155, 227/156; 24/33 B; 206/338, 230

[56] References Cited

U.S. PATENT DOCUMENTS

| | | | |
|---|---|---|---|
| 1,263,218 | 4/1918 | Fischer. | |
| 1,747,390 | 3/1927 | Robb. | |
| 3,450,255 | 6/1969 | Mosetich. | |
| 3,679,266 | 7/1972 | Jenkins | 301/9 DN |
| 3,774,755 | 11/1973 | Cast et al.. | |
| 3,779,373 | 12/1973 | Maier. | |
| 3,885,669 | 5/1975 | Potucek | 206/338 |
| 3,904,032 | 9/1975 | Maier | 206/347 |
| 3,913,180 | 10/1975 | Pray | 24/33 B |
| 3,944,068 | 3/1976 | Maier et al. | 206/347 |
| 4,018,334 | 4/1977 | Lejdegard | 206/346 |
| 4,033,456 | 7/1977 | Wion et al. | 206/347 |
| 4,212,094 | 7/1980 | Pray | 24/33 B |
| 4,218,953 | 8/1980 | Haytayan | 85/68 |
| 4,258,461 | 3/1981 | Pray | 24/33 B |
| 4,333,217 | 6/1982 | Pray | 29/243.51 |
| 4,344,213 | 8/1982 | Pray | 29/243.5 |
| 4,349,106 | 9/1982 | Bogel | 206/347 |
| 4,380,109 | 4/1983 | Pray | 24/33 B |
| 4,403,694 | 9/1983 | Schmale | 206/347 |
| 4,684,022 | 8/1987 | Potucek | 206/347 |
| 4,718,551 | 1/1988 | Whitledge | 206/347 |

FOREIGN PATENT DOCUMENTS

3332927C1 4/1985 Fed. Rep. of Germany.
2146730A 4/1985 United Kingdom.

Primary Examiner—William I. Price
Attorney, Agent, or Firm—Fitch, Even, Tabin & Flannery

[57] ABSTRACT

Disclosed is a device for supporting a plurality of rivets in a desired orientation and spacing for insertion of the rivets as a group into the plurality of apertures of a belt fastener. The rivet holder comprises two portions which are releasably interconnected such that the two portions are separable upon application of manual force thereto to release the rivets from the rivet holder as a group upon application of manual force. In one embodiment, the rivet holder comprises two portions which are pivotally interconnected in such a manner that the two portions are not separable until sufficiently pivoted with respect to one another. This prevents the two portions from separating prior to the time of intended use, as may otherwise occur during transport or the like in which there may be forces acting on the rivets tending to force the two rivet holder portions apart which would result in the premature release of the rivets.

11 Claims, 8 Drawing Sheets

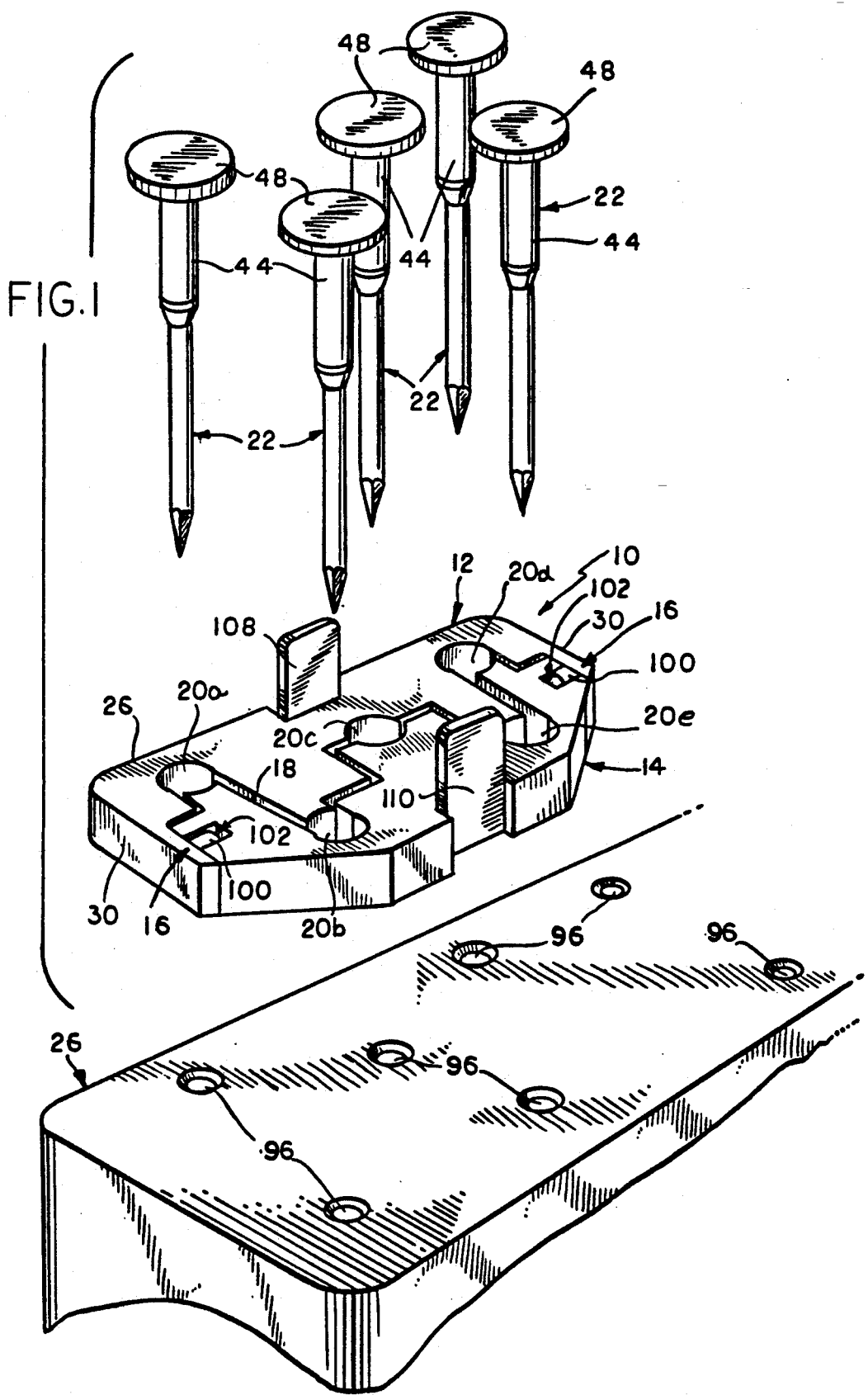

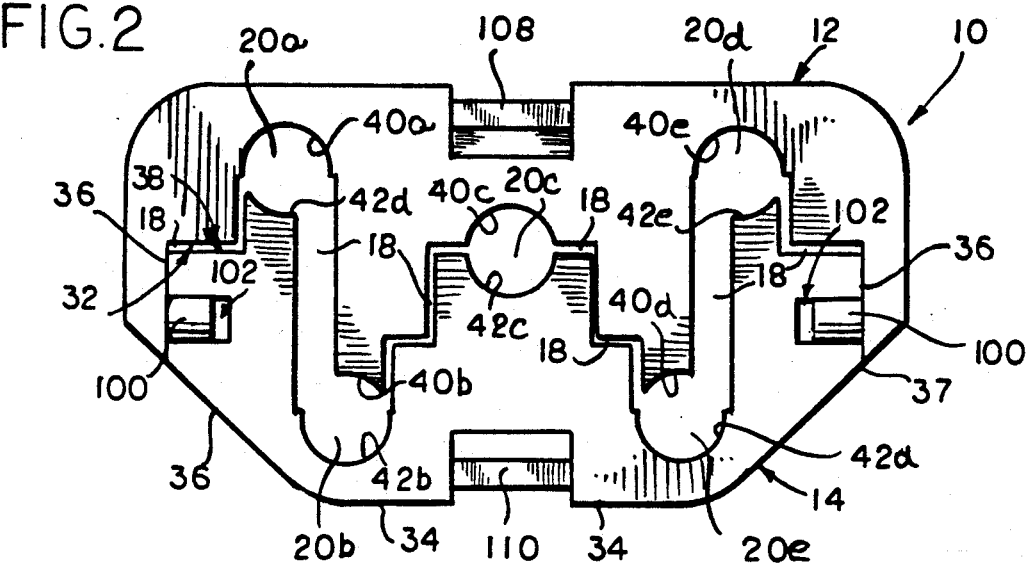
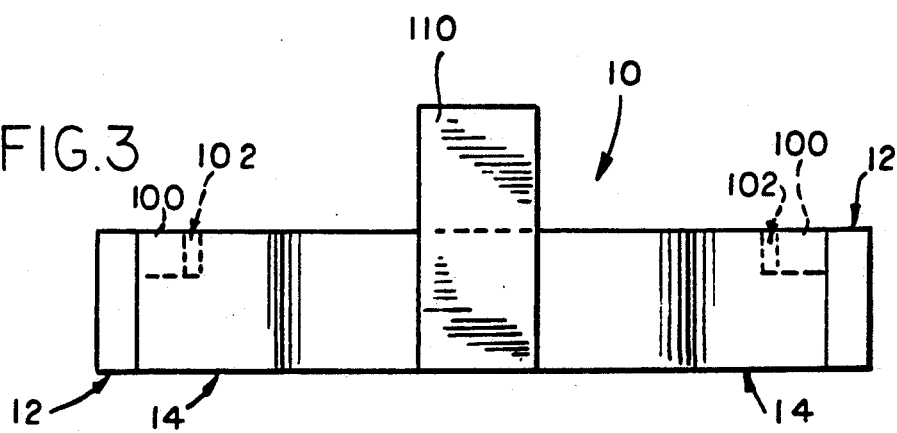
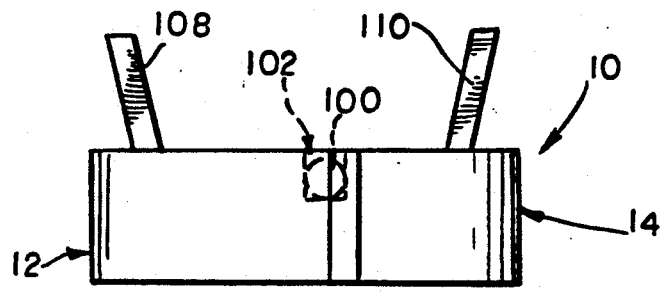

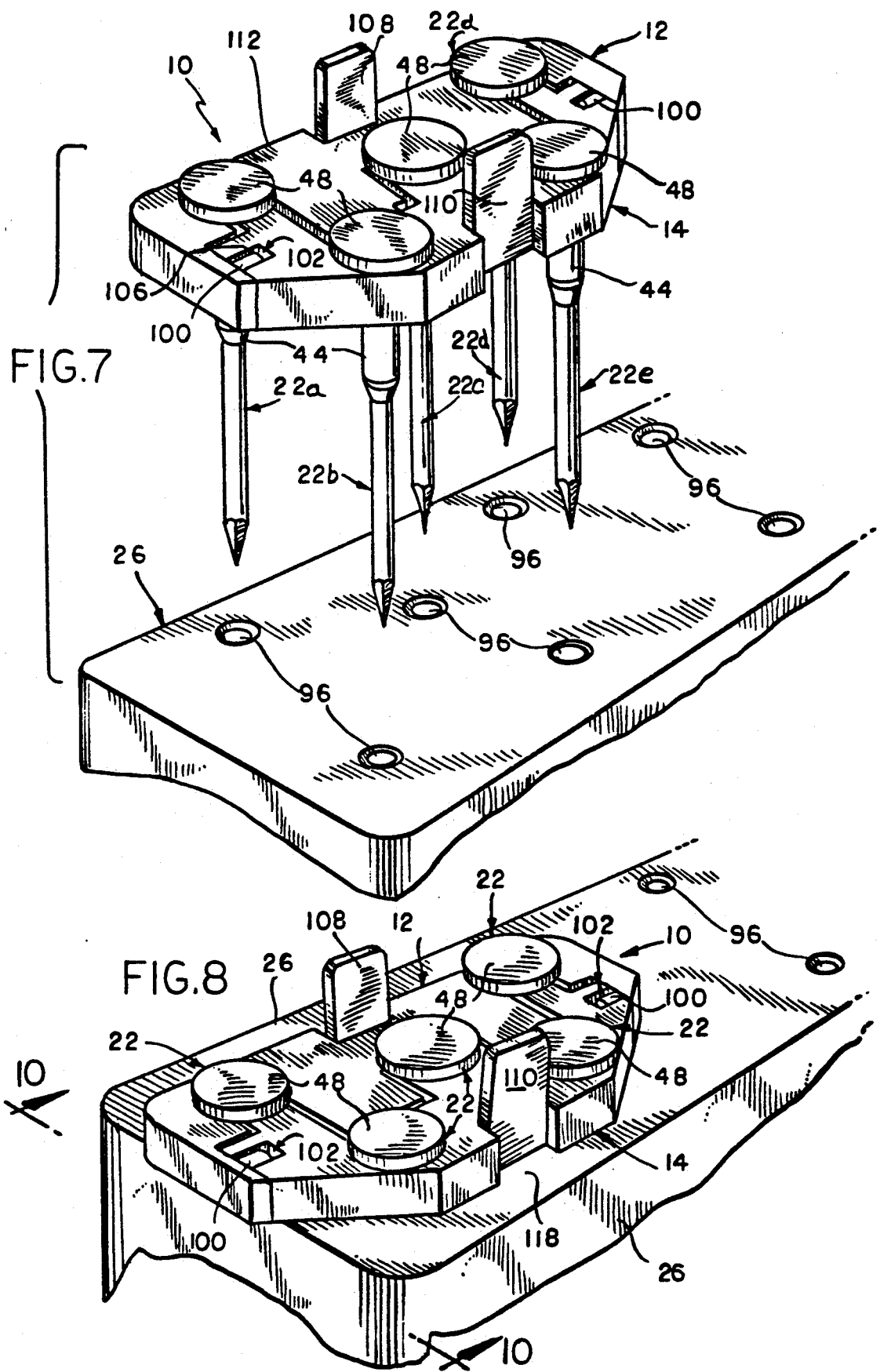

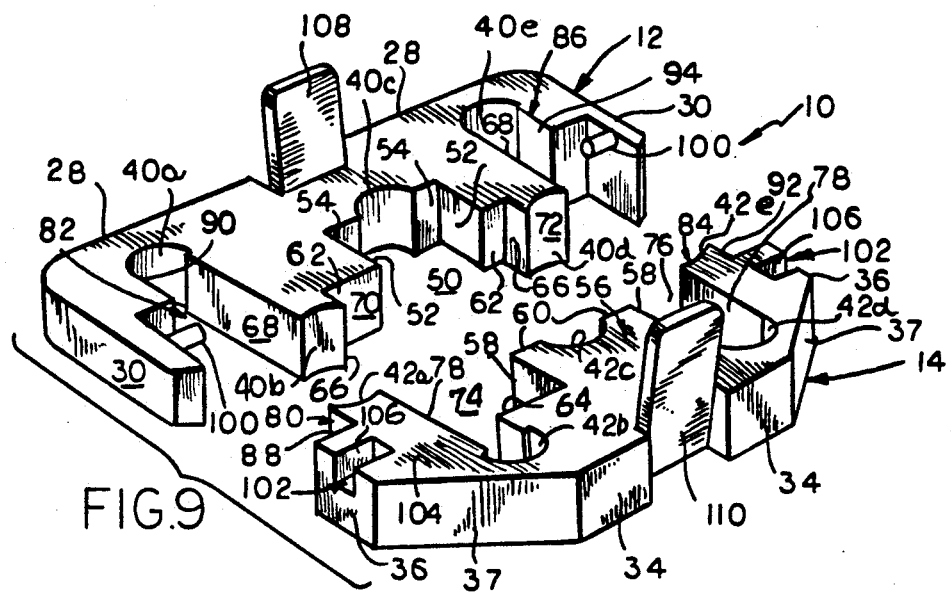
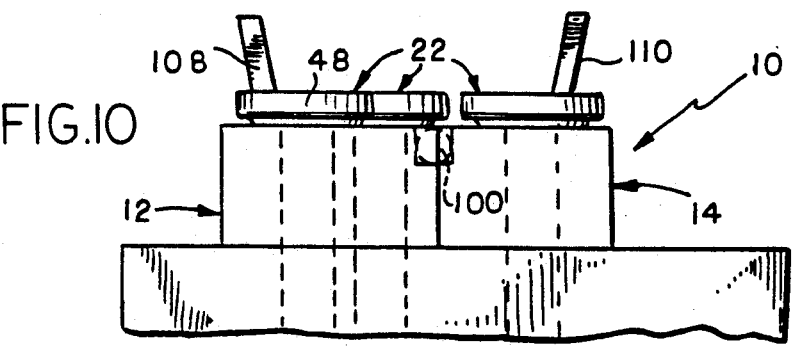
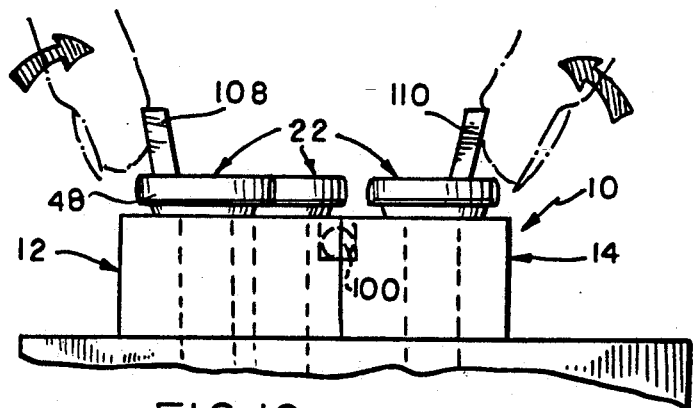
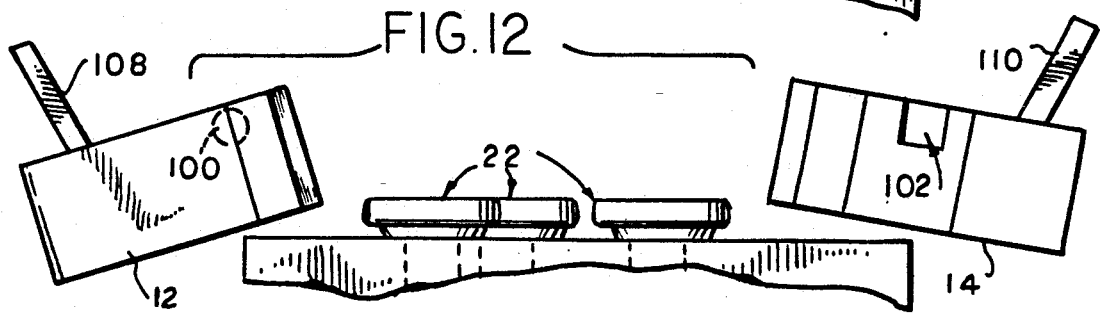

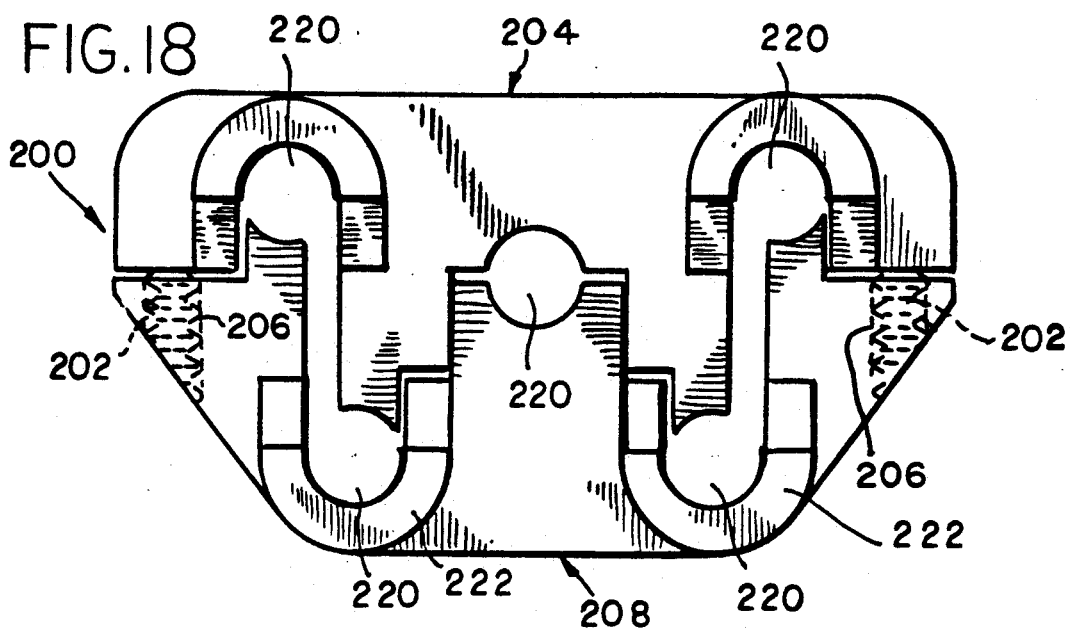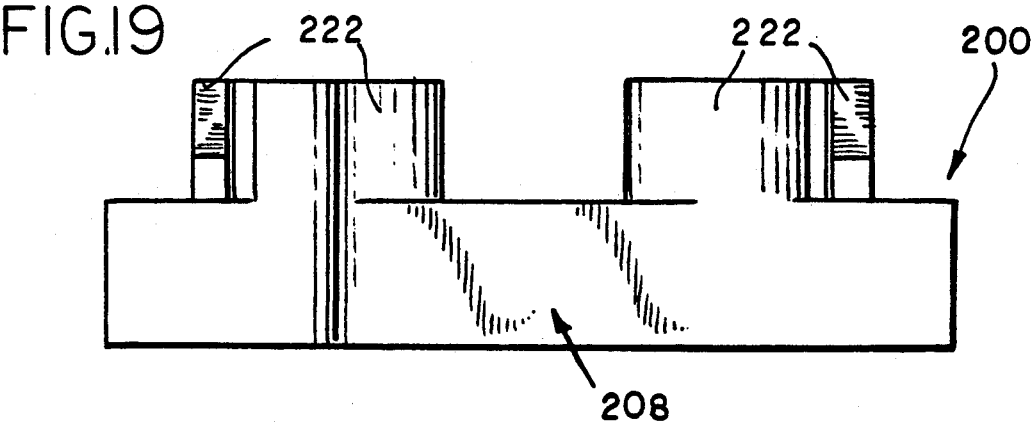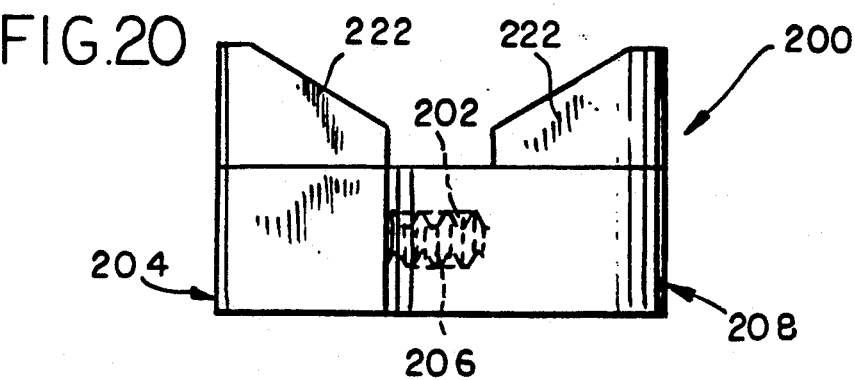

SNAP APART RIVET HOLDER

FIELD OF THE INVENTION

The present invention relates to a device for supporting a plurality of rivets in a predetermined arrangement and orientation for group insertion into a belt fastener.

BACKGROUND OF THE INVENTION

A variety of belt fasteners are currently employed to fasten belt ends together. The system disclosed herein may be used in the joining of various and diverse belt fasteners to a belt, and lends itself to utilization with plate-type belt fasteners as well as hinged-type belt fasteners. Hence, the present invention is not to be construed as limited to the illustrated and described embodiment of the invention wherein the belt fastener is a hinged type of fastener.

A typical plate-type belt fastener is shown in U.S. Pat. No. 3,141,346, and other belt fasteners, such as hinged-type belt fasteners, are shown in U.S. Pat. Nos. 3,742,557 and 3,176,358. In both kinds of belt fasteners, upper and lower portions thereof are secured to the top and bottom surfaces of a belt by rivets. The belt fasteners are secured tightly to, and generally flush against, the respective top and bottom sides of the conveyor belt by a plurality of rivets which project through apertures in the belt fastener and are driven through the belt and flared against the belt fasteners to maintain them in tight engagement with the belt.

A number of belt fasteners are secured along the widths of the free ends of the belt to be joined, with each of the numerous belt fasteners having a plurality of apertures into which rivets are received and secured. Hence, in securing belt ends together, a large quantity of rivets must be inserted in an upright position into each of the plurality of belt fastener apertures prior to driving and flaring of the rivets. Usually, a large hammer or mallet is used to drive simultaneously a group of rivets into a single belt fastener. For example, five rivets may be inserted into a rivet guide block which is positioned over the top of a single belt fastener which will be secured to the belt end by these five rivets.

The process of picking up the rivets individually, reorienting them to their proper orientation, and inserting them into each of the plurality of apertures in a guide block for each of the numerous belt fasteners requires a considerable expenditure of time. There is a need for means for reducing the time required to insert a plurality of rivets into the guide block and the belt fastener apertures.

Conventionally, a bucket is filled with a quantity of loose rivets, with the pile of loose rivets being oriented in various directions. The operator reaches into the bucket to grab an individual rivet, removes the rivet from the bucket, orients the rivet in its proper position, and then inserts the rivet into a belt fastener aperture. Since several rivets are employed for each belt fastener and several belt fasteners are employed for each belt end connection, considerable time is thus spent grabbing each individual rivet, properly reorienting each individual rivet, and then inserting each rivet individually into one of the belt fastener apertures.

Furthermore, where the rivets are in the form of a rivet assembly including a combined piercing nail detachably connected to a separable rivet portion, the nails have a sharp pointed end. Since the pile of rivets in the bucket are in a randomly disoriented heap, operators may prick their fingers on the sharp, leading ends of some of the nails which may be oriented upside down in the bucket. Thus, in practice, operators tend to reach cautiously into the bucket to remove the rivets individually, which further slows down the rivet insertion process.

There is a need for a rivet holder which is inexpensive to manufacture so that the rivet holder may be disposed of following insertion and release of the rivets. Hence, by not having to be concerned w picking up a rivet holder following its separation from the rivets, one rivet holder after another, with their groups of rivets supported therein in proper orientation, may be picked up in rapid succession, the rivets inserted as a group into rivet receiving apertures, and the rivets then released.

To minimize costs, and to minimize the operator time associated with the rivet inserting operations, the rivet holder should lend itself to automated assembly. Assembled rivet holders with their respective groups of rivets supported therein can then be loaded into a bucket to allow a handful of the rivets to be removed from the bucket in groups for group insertion and release into appropriate rivet receiving apertures.

SUMMARY OF THE INVENTION

In accordance with the present invention, a snap-apart rivet holder is provided which allows the insertion of rivets into the belt fastener apertures as a group with each of the rivets in their proper orientation. Following insertion, the rivet holder may be snapped apart by application of manual pressure to separate the rivets from the rivet holder, with the rivets then being released within the closure member apertures.

Thus, groups of rivets supported within their respective rivet holders are carried in a bucket, rather than having the rivets lying in a loose pile in the bucket. During transport of the bucket of rivets, the lower ends of the rivets may be pressed together inwardly, causing the upper ends of the rivets to move outwardly and thereby causing the rivet holder to fly apart. Accordingly, the rivet holder must have the ability to withstand this loading during transport to prevent premature release of the rivets from their rivet holders.

The rivet holder of the preferred embodiment comprises a plastic body having a plurality of apertures for receiving and engagingly supporting rivets therein in an upright position. The number and arrangement of the apertures in the rivet holder corresponds to the number and arrangement of the apertures in the belt fastener. Hence, the group of rivets supported by the rivet holder may be inserted as a group into the apertures of a belt fastener, rather than being inserted individually as practiced in the prior art.

The body of the rivet holder comprises two portions which are releasably joined together in a manner which allows the two portions to be separated along a parting line upon application of manual pressure. Each of the apertures in the body of the rivet holder is defined at least in part by the parting line. Thus, following the group insertion of the plurality of rivets supported by the rivet holder into the apertures of a belt fastener, manual pressure is applied to the rivet holder which separates the two body portions of the rivet holder, whereby the rivets are released from the rivet holder together as a group.

In one embodiment of the invention, the two body portions of the rivet holder are pivotally interconnected in such a manner that the body portions are not separable until they have been sufficiently pivoted with respect to one another, whereafter the two body portions are easily separable. This prevents the two body portions from separating and releasing the rivets prior to the time of intended use, such as during transport or the like, in which there may be forces acting on the rivets tending to force the two rivet holder portions apart prior to insertion of the rivets into the belt fastener.

BRIEF DESCRIPTION OF THE DRAWINGS

In the drawings, wherein like elements are referenced alike:

FIG. 1 is a perspective view of a rivet holder embodying various features of the present invention, shown situated between a plurality of rivets and a rivet guide block;

FIG. 2 is a plan view of the rivet holder of FIG. 1;

FIG. 3 is a front elevational view of the rivet holder of FIG. 1;

FIG. 4 is a side elevational view of the rivet holder of FIG. 1;

FIG. 7 is a perspective view of the rivet holder of FIG. 1, shown with the rivets supported within the rivet holder apertures and positioned above the guide block passageways;

FIG. 8 is a perspective view of the rivet holder of FIG. 1, shown with the rivets inserted as a group into the guide block passageways;

FIG. 9 is an exploded perspective view of the rivet holder of FIG. 1;

FIG. 10 is a side elevational view of the rivet holder with the rivets inserted in the guide block, taken along line 10—10 of FIG. 8;

FIG. 11 is a side elevational view of the rivet holder with the rivets inserted in the guide block, showing the application of manual pressure to separate the two portions of the rivet holder;

FIG. 12 is a view of the rivet holder as in FIG. 11, with the two portions of the rivet holder shown separated and the rivets thereby being released within the guiding block;

FIG. 18 is a plan view of the alternate embodiment rivet holder of FIG. 15;

FIG. 19 is a front elevational view of the alternate embodiment rivet holder of FIG. 15; and FIG. 20 is a side elevational view of the alternate embodiment rivet holder of FIG. 15.

DETAILED DESCRIPTION OF THE PREFERRED EMBODIMENTS

Figure 5:
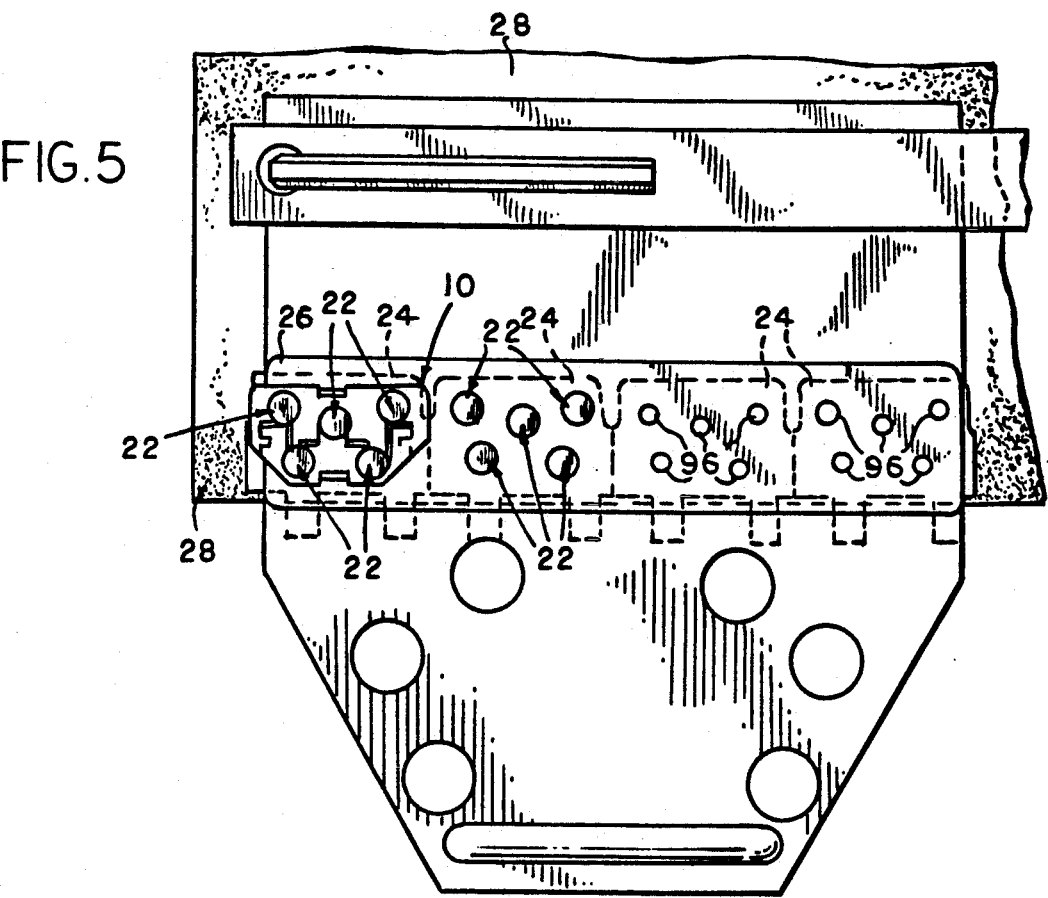
FIG. 5 is a plan view of an apparatus for applying belt fasteners to a belt, showing rivets supported by a rivet holder being received within the passageways of the guide block of the belt fastener applying apparatus.

Rivets 22, such as those shown in FIG. 1, are used to fasten belt fasteners to belt ends. The rivets 22 are conventionally carried in a bucket in a randomly oriented pile. The term "rivet" is used herein to refer to the rivet assembly shown in the drawings which includes an upper rivet portion and a detachable, lower nail portion. Manifestly, the rivets need not have the lower nail portion. Conversely, the invention would apply to belt fastener installation using groups of solid nails. The operator reaches into the bucket of randomly oriented rivets 22 and pulls out one rivet at a time, orients that rivet to an upright position, and inserts that rivet into one of the apertures in a belt fastener. This procedure of picking up one rivet from the bucket, properly orienting it, and inserting it into the belt fastener is repeated over and over again until all of the rivet receiving apertures of the belt fastener are filled. Thereafter, the rivets are then driven through the belt and their ends flared as a group, with all of the rivets of the belt fastener being driven simultaneously with a single hammer blow. Accordingly, with this conventional rivet loading procedure, considerable time is required to individually remove, orient, and insert each of the rivets into their respective rivet receiving apertures.

A rivet holder in accordance with the preferred embodiment of the present invention is illustrated in FIGS. 1-12. The preferred rivet holder comprises a body referred to generally at 10 consisting of two portions, a first body portion 12 and a second body portion 14. The first and second body portions 12 and 14 are releasably joined together by releasable means 16 with the two body portions defining an interface or parting line 18 therebetween.

The body 10 has a plurality of apertures therein, referred to generally by numeral 20. The apertures 20 are proportioned to engagingly support rivets 22 therein when the first and second body portions are joined together, as shown in FIG. 7. The apertures 20 all lie along the interface or parting line 18, so that upon separation of the first body portion 12 from the second body portion 14 the size of the apertures 20 are increased in proportion to the amount of separation.

Figure 6:
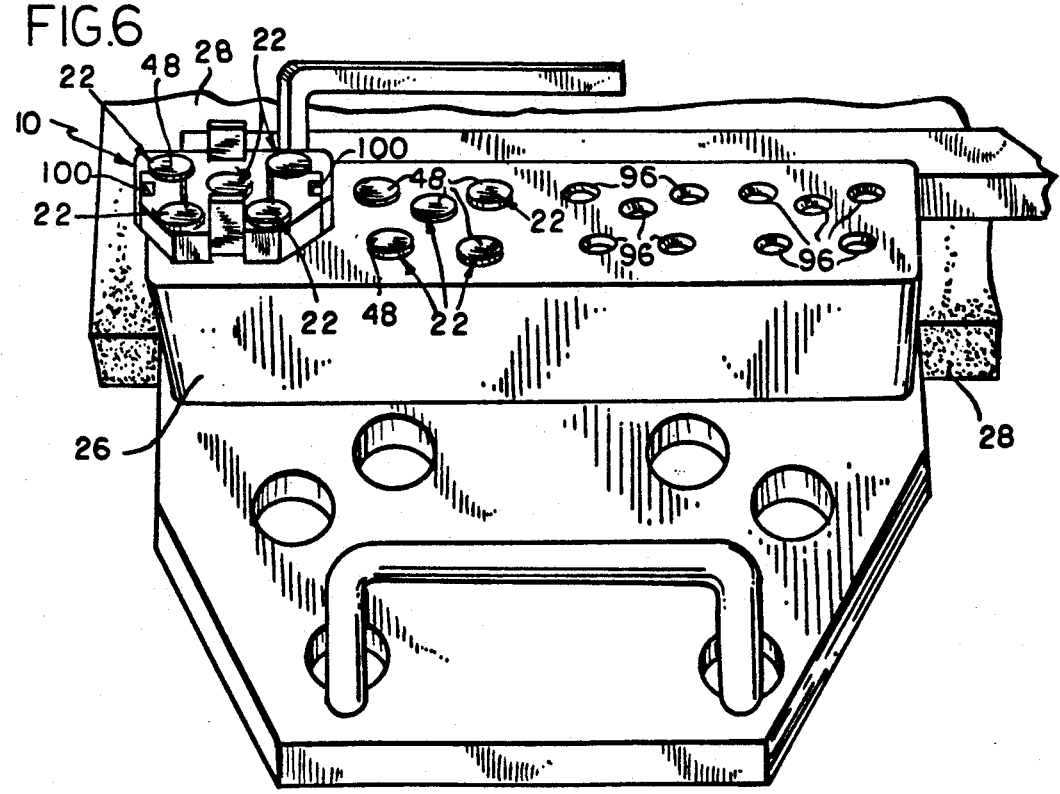
FIG. 6 is a perspective view of the apparatus of FIG. 5.

Once a plurality of rivets 22 have been inserted within respective apertures 20 of the block 10, the rivets 22 remain retained therein in an upright orientation (see FIG. 7) for insertion of the rivets 22 as a group into a belt fastener 24 or rivet guide block 26 (see FIGS. 5, 6 and 8). Thereafter, the first and second body portions 12 and 14 are separable by application of manual pressure thereto, as will be explained in detail below. Upon separation of the first and second body portions 12 and 14, the rivets 22 are completely released from the rivet holder body 10 and supported within a belt fastener for subsequent driving through a belt 28. With employment of the rivet guide block 26 and associated assembly, as illustrated in FIG. 6, the group of rivets are then hit with a single hammer blow to drive all of the rivets simultaneously through the belt.

Hence, the rivet holder of the present invention allows for a plurality of rivets 22 to be picked up as a group and inserted as a group into rivet receiving apertures, which may be either apertures in a closure member, passageways in a rivet guide block, or other rivet receiving apertures. Thereafter, the rivets 22 may be released within the rivet receiving apertures as a group by separating the first and second body portions 12 and 14 through the releasable means 16.

The general construction and operation of the rivet holder of the present invention having been explained in general above, the invention is described in greater detail below.

With reference to FIG. 9, the first body portion 12 comprises an integral component having a generally planar rear wall 28 and two sidewalls 30 with a non-planar inner wall 32. The second body portion 14 similarly comprises an integral component having a generally planar rear wall 34 and two sidewalls 36 with angled wall sections 37 therebetween and having a non-planar inner wall 38.

The inner wall 32 of the first body portion 12 and the inner wall 38 of the second body portion 14 are shaped complementary to one another. The inner walls 32 and 38 both include a plurality of arcuate sections over portions thereof such that, when the two inner walls 32 and 38 are placed immediately adjacent one another or into abutment with one another, the arcuate sections 40a–e of the inner wall 32 of the first body portion 12 align with respective arcuate sections 42a–e of the inner wall 38 of the second body portion 14 to define a plurality of generally circular apertures 20a–e therebetween. (see FIGS. 1 and 2)

More specifically, with reference to FIG. 2, arcuate section 40a of the inner wall 38 of the first body portion 12 and arcuate section 42a of the second body portion 14, when immediately adjacent or in abutment with one another, substantially define a generally circular aperture 20a. Likewise, arcuate section 40b of the inner wall 38 of the first body portion 12 and arcuate section 42b of the second body portion 14, when immediately adjacent or in abutment with one another, substantially define a generally circular aperture 20b. Similarly, when immediately adjacent or in abutment with one another, complementary arcuate sections 40c and 42c substantially define generally circular aperture 20c; arcuate sections 40d and 42d substantially define generally circular aperture 20d; and arcuate sections 40d and 42e substantially define generally circular aperture 20e.

Each of the arcuate sections 40a–e and 42a–e is proportioned in relation to the diameter of the rivets 22 to be employed, such that each of the apertures 20a–e defined by the arcuate sections 40a–e and 42a–e engagingly supports a rivet 22 therein, as shown in FIG. 7. That is, when the inner wall 32 of the first body portion 12 and the inner wall 38 of the second body portion 14 are held together, the arcuate sections 40a–e of the first body portion 12 and the arcuate sections 42a–e of the second body portion 14 press together against opposite sides of the rivet shaft 44 to engagingly support a rivet 22 within each of the apertures 20a–e. Alternatively, the apertures 20a–e may be made larger so that the rivets 22 are engagingly supported at the enlarged rivet head 48. The press fit or friction grip of the rivets 22 by the rivet holder body 10 on the rivets 22 prevents the rivets 22 from falling out of the rivet holder when it is tipped or lifted for insertion. Likewise, the press fit or friction grip of the body 10 on the rivets 22 exerts outward forces on the first and second body portions 12 and 14 which effects a press fit or friction grip of the pins 100 within their respective slots 102.

Accordingly, as best seen in FIG. 7, a plurality of rivets 22 may be simultaneously engagingly supported within respective apertures 20a–e, so long as the inner walls 32 and 38 of the first and second body portions 12 and 14 are maintained immediately adjacent or abutting one another. Hence, with reference to FIGS. 7 and 8, the group of rivets 22 can be picked up and inserted as a group into the desired rivet-receiving apertures, which may be belt fastener apertures 46, rivet guide block passageways 96 (see FIGS. 5 and 6), or the like.

With the rivet holder 10 of the preferred and illustrated embodiment, five rivets 22 can be inserted into corresponding rivet-receiving apertures in approximately the same time as was previously required to insert a single rivet 22. It is important, in order to minimize production downtime associated with belt failure, that belt repairs be made as quickly as possible. The rivet holder of the present invention provides means for significantly reducing downtime associated with belt failure by reducing the rivet loading time.

The inner wall 32 of the first body portion 12 is symmetrical on either side of arcuate section 40c, and the inner wall 38 of the second body portion 14 is also symmetrical on either side of arcuate section 42c. With reference to FIG. 9, at the center section of the inner wall 32 of the first body portion 12 is a first recess 50 defined laterally by inwardly facing recess walls 52, and defined at its inner end by inner wall sections 54 which have arcuate section 40c in the middle thereof.

Upon engaging the first and second body portions 12 and 14, the first channel 50 receives a first projection 56 of the second body portion 14, as seen in FIGS. 1 and 2. The first projection 56 is defined at its lateral sides by outwardly facing projection walls 58 and defined at its leading, free end by inner wall sections 60 which have arcuate section 42c in the middle thereof.

With reference to FIGS. 1 and 2 it will be seen that upon full insertion of the first projection 56 into the first recess 50, the arcuate sections 40c and 42c are brought together to form the generally circular aperture 20c in which a rivet 22 is engagingly supported (see FIG. 7). With continued reference to FIGS. 1 and 2, it will be seen that with the first projection 56 fully inserted within the first recess 50, there are narrow gaps between the inwardly facing recess walls 52 and the outwardly facing projection walls 58, as well as between the inner wall sections 54 and the inner wall sections 60. Accordingly, the first projection 56 of the second body portion 14 can slide freely into and out of the first recess 50 of the first body portion. Thus, there is little or no resistance to separation of the first body portion 12 from the second body portion 14.

Extending generally perpendicularly from the inwardly facing recess walls 52 of the first body portion 12 and the outwardly facing projection walls 58 of the second body portion 14, respectively, are planar walls 62 and 64. As seen in FIGS. 1 and 2, the planar walls 62 and 64 lie opposing one another with a narrow gap therebetween upon engagement of the first body portion 12 with the second body portion 14.

With reference to FIG. 9, extending forward from, and perpendicularly to the planar walls 62, are inwardly facing sidewalls 66 which extend forward to the arcuate sections 40b and 40d of the inner wall 38. The arcuate sections 40b and 40d of the first body portion 12 extend to outwardly facing sidewalls 68 which extend generally parallel to the inwardly facing sidewalls 66.

Hence, with reference to FIG. 9, the aforementioned walls define a second projection 70 immediately to the left of the first recess 50 which is, more specifically, defined by recess wall 52, planar wall 62, arcuate section 40b, and outwardly facing sidewall 68. Similarly, with continued reference to FIG. 9, the aforementioned walls define a third projection 72 immediately to the right of the first recess 50 which is more specifically, defined by recess walls 52, planar wall 62, arcuate section 40d, and outwardly facing sidewall 68.

The second and third projections 70 and 72 of the first body portion 12 are, respectively, received within corresponding, complementary second recess 74 and third recess 76 of the second body portion 14. With still further reference to FIG. 9, the second recess 74 is immediately to the left of the first projection 56, and is defined by projection wall 58, planar wall 64, arcuate section 42b, and inwardly facing recess wall 78. Similarly, the third recess 76 is immediately to the right of the first projection 56, and is defined by projection wall 58, planar wall 64, arcuate section 42d, and inwardly facing recess wall 78.

As best seen in FIGS. 1 and 2, and with reference also to FIG. 9, when the first body portion 12 and the second body portion 14 are brought together, the first projection 56 is received within first recess 50 whereby arcuate section 40c is brought adjacent arcuate section 42c to form the generally circular aperture 20c into which a rivet 22 is engageably received. Also, the second projection 70 is received within the second recess 74 whereby arcuate section 40b is brought adjacent arcuate section 42b to form the generally circular aperture 20b into which another rivet 22 is engageably received. Likewise, the third projection 72 is received within the third recess 76 whereby the arcuate section 40d is brought adjacent arcuate section 42d to form the generally circular aperture 20d into which still another rivet 22 is engageably received.

With reference again to FIG. 9, there is a fourth projection 80 immediately to the left of the second recess 74 of the second body portion 14, and there is a fourth recess 82 immediately to the left of the second projection 70 of the first body portion 12, into which the fourth projection 80 is received when the first and second body portions 12 and 14 are brought together. Similarly, there is a fifth projection 84 immediately to the right of the third recess 76 of the second body portion 14, and there is a fifth recess 86 immediately to the right of the third projection 72 of the first body portion 12 into which the fifth projection 84 is received when the first and second body portions 12 and 14 are brought together.

With still further reference to FIG. 9, the fourth projection 80 is defined by recess sidewall 78, arcuate section 42a, and projection sidewall 88. The fourth recess is defined by outwardly facing sidewall 68, arcuate section 40a, and inwardly facing sidewall 90. As seen in FIGS. 1 and 2, upon full insertion of the fourth projection 80 into the fourth recess 82, arcuate section 42a is brought adjacent arcuate section 40a to form annular aperture 20a, into which a rivet 22 is engagingly received.

Referring again to FIG. 9, the fifth projection 84 is defined by recess sidewall 78, arcuate section 42e, and projection sidewall 92. The fifth recess 86 is defined by outwardly facing sidewall 68, arcuate section 40e, and inwardly facing sidewall 94. Upon full insertion of the fifth projection 84 into the fifth recess 86, arcuate section 42e is brought adjacent arcuate section 40e to form annular aperture 20e, into which a rivet is received.

Briefly summarizing the above, when the first body portion 12 is engaged with the second body portion 14, each of the projections 56, 70, 72, 80 and 84 is slidably received in a corresponding complementary recess 50, 74, 76, 82 and 86. Each of the projections 56, 70, 72, 80 and 84 has a respective arcuate section 42c, 40b, 40d, 42a and 42e which is brought adjacent respective corresponding arcuate sections 40c, 42b, 42d, 40a and 40e of the recesses 50, 74, 76, 82 and 86 to form respective circular apertures 20c, 20a, 20b, 20d and 20e each of which receives a rivet 22.

Hence, as seen in FIG. 7, when the first body portion 12 and the second body portion 14 are engaged with one another, rivets 22 may be engagingly supported in each of the apertures 20a-e. The plurality of rivets 22 may then be lifted as a group and inserted as a group into the desired rivet-receiving apertures such as the vertical passageways 96 of a rivet guide block 26, as shown in FIG. 8.

The non-planar parting line or interface 18 between the first body portion 12 and the second body portion 14 is in communication with each of the apertures 20a-e. With reference to FIG. 7, rivets 22a and 22d are situated on one side of the parting line 18, while rivets 22b and 22e are situated on the other side of the parting line 18, with rivet 22c being situated halfway on either side of the parting line 18.

Upon separation of the first body portion 12 from the second body portion 14, each of the projections 56, 70, 72, 80 and 84 slides out of its corresponding complementary recess 50, 74, 76, 82 and 86. Thereupon, the arcuate sections 40a-e of the first body portion 12 are move away from the corresponding arcuate sections 42a-e of the second body portion 14. Upon separation, the apertures 20a-e are thereby enlarged to the point where the rivets 22 are no longer engagingly supported therein and, therefore, the rivets 22 are then released from the rivet holder 10.

In accordance with an important aspect of the present invention, the first body portion 12 and the second body portion 14 are retained engaged with one another by a releasable means 16 which allows for the complete separation of the first and second body portions 12 and 14 upon application of manual pressure thereto.

Figure 13:
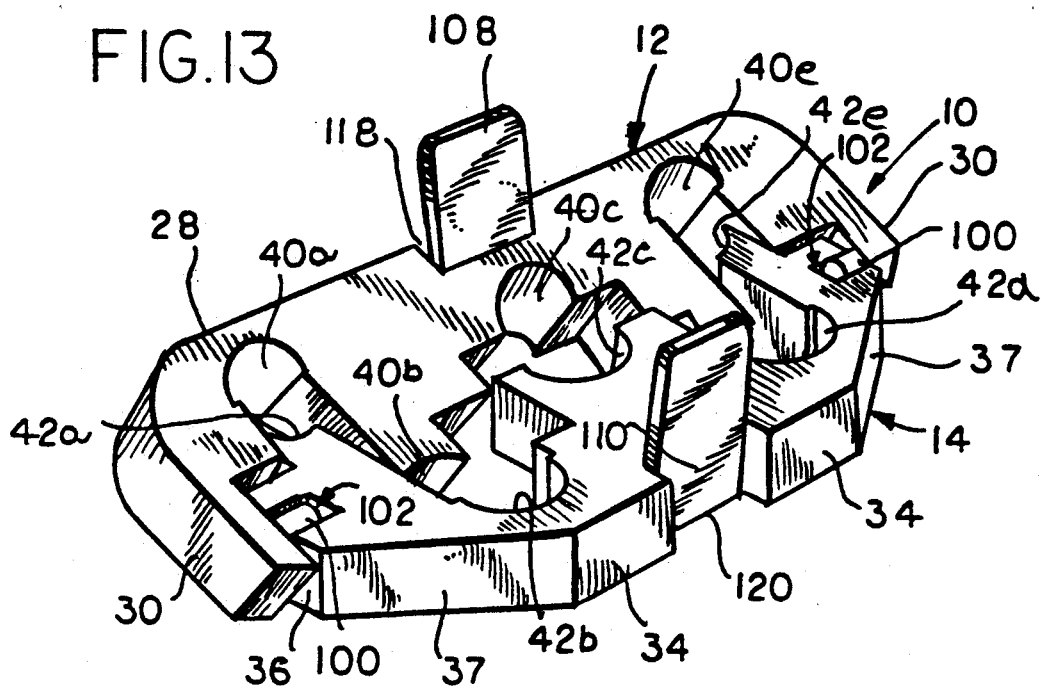
FIG. 13 is a perspective view of the rivet holder of FIG. 1, shown in a pivoted position.
Figure 14:
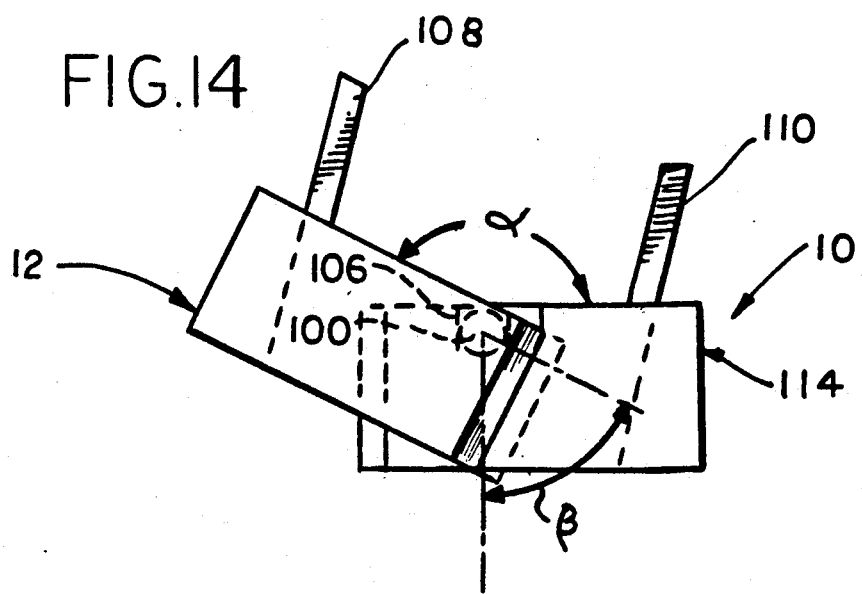
FIG. 14 is a side elevational view of the pivoted rivet holder of FIG. 13.
Figure 15:
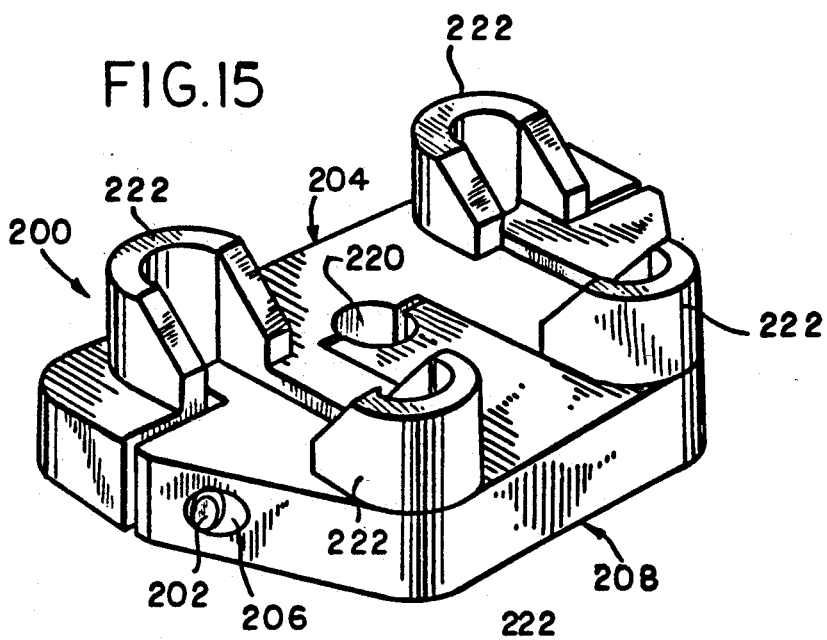
FIG. 15 is a perspective view of an alternative embodiment a rivet holder embodying various features of the present invention.

With reference to FIG. 9, the preferred releasable means 16 of the present invention for releasably securing the first and second body portions 12 and 14 together comprises a pin-in-slot arrangement whereby the first and second body portions 12 and 14 are pivotally interconnected for pivoting of the first and second body portions 12 and 14 with respect to one another about pivot pins 100. Pivot pins 100 are coaxial and extend inwardly from the opposite sidewalls 30 of the first body portion 12. The pivot pins 100 are slidably received in slots 102 formed at the sidewalls 36 of the second body portion 14, with the pivot pins 100 rotatable within the slots to facilitate pivoting of the first and second body portions 12 and 14 with respect to one another about the pins 100 as shown in FIGS. 13 and 14.

As best seen in FIG. 9, the slots 102 extend into the second body portion 14 from both the sidewalls 36 and the upper surface 104 of the second body portion. Hence, the pivot pins 100 are slidable downward into the slots 102 through the slot opening 106 at the upper surface 104 of the second body 14 until the pins 100 are fully within the slots 102 as seen in FIG. 1. The engagement of the pins 100 within the slots 102 maintains engagement of the first body portion 12 with the second body portion 14. As discussed above, whence engaged, the first and second body portions 12 and 14 define a plurality of apertures 20a–e which engagingly receive and support a plurality of rivets 22 therein.

The rivets 22 exert a force against respective arcuate sections 20a–e and 24a–e of the first and second body portions 12 and 14 tending to separate the first and second body portions 12 and 14. The rivet holders 10 with rivets 22 therein are assembled in advance, preferably by an automated operation, and transported as assembled units. During transport of rivet holders 10 with rivets 22 supported therein, there may be forces bearing upon the lower ends of the rivets 22 tending to urge the lower ends of the rivets 22 toward one another. This results in the upper ends of the rivets 22 being urged away from one another and still further urging the first and second body portions 12 and 14 apart. The body portions 12 and 14 are prevented from separating under the outwardly exerted forces by the pins 100 bearing against the forward wall 106 of the slots 102. Thus, once a plurality of rivets 22 have been secured within respective apertures 20a–e, the rivets 22 are retained therein with the first and second body portions 12 and 14 being generally co-planar as shown in FIGS. 7 and 8.

While preventing the separation of the first and second body portions 12 and 14 during transport and during group insertion of the plurality of rivets 22 supported by the rivet holder 10 into rivet-receiving apertures, even with substantial separating forces acting thereon, the releasable means of the preferred embodiment allows easy separation of the first and second body portions 12 and 14 upon application of manual pressure to release the rivets 22 from the rivet holder 10.

In accordance with the preferred embodiment of the invention, the releasable means 18 comprises the aforementioned pin-in-slot arrangement, by which the first and second body portions 12 and 14 are separable upon pivoting of the body portions 12 and 14 with respect to one another. As discussed above, when the first and second body portions 12 and 14 are in their initial, generally co-planar relation, the first and second body portions 12 and 14 are prevented from separating, under the force of the rivets 22 urging the body portions apart, by the pivot pins 100 bearing against the forward walls 106 of the slots.

With reference to FIGS. 13 and 14, the pin-in-slot arrangement of the releasable means 18 of the present invention allows the first and second body portions 12 and 14 to be pivoted with respect to one another about the pivot pins 100. Upon pivoting of the first and second body portions 12 and 14 with respect to one another, the pivot pins 100 are no longer exert a force normal to the forward slot wall 106, but, rather, exert a force at an angle to the forward slot wall 106. As the first and second body portions 12 and 14 are pivoted further and further with respect to one another, the angle of the force of the pins 100 bearing against the forward slot wall 106 becomes more and more acute.

That is, with reference to FIG. 14, as the angle α between the first and second body portions 12 and 14 is increased, the angle β, which represents the angle at which the pin 100 exerts its force against the forward slot wall 106, is decreased. Thus, in comparing FIGS. 10 and 14, the angle α in FIG. 10, wherein the first and second body portions are co-planar, is 180° and the angle β is 90°. Hence, the force of the pins 100 against the forward walls 106 of the slots 102 is normal to, or at 90° to, the forward slot wall 106. In this position there is no vectorial pin force acting on the wall in any direction but straight against the forward pin wall 106.

Hence, regardless of the magnitude of the force urging the first and second body portions 12 and 14 apart, there is no tendency for the pins 100 to slide out of the slots 102.

However, upon pivoting of the first and second body portions 12 and 14 with respect to one another, as shown in FIG. 14, the angle α becomes less than 180° and the angle β becomes less than 90°. Thus, the force of the pin 100 bearing against the forward slot wall 106 now includes an upward component. That is, as viewed in FIG. 14, the force of the pin 100 against the forward slot wall 106 is both to the left and upward. The greater the pivoting of the first and second body portions 12 and 14 with respect to one another, the more the angle β is decreased and, hence, the greater the force urging the pins 100 upward, to slide out of the slots 102.

Thus, upon the initial, slight pivoting of the first and second body portions 12 and 14 with respect to one another, the vertical component of the pin force against the forward slot wall 106 is minimal. At this stage of pivoting, the frictional force between the pins 100 and the forward slot walls 106 is sufficient to overcome the vertical component of the pin force against the forward slot wall 106 and, hence, the friction prevents the pins 100 from sliding upward and out of the slots 102.

However, upon further pivoting of the first and second body portions 12 and 14 with respect to one another, the vertical component of the pin force against the forward slot wall 106 becomes sufficiently large that the frictional force between the pins 100 and the forward slot wall 106 is overcome, and the pins 100 then slide upward and out of their respective slots 102. Thus, by pivoting the first and second body portions 12 and 14 sufficiently with respect to one another, the pins 100 slide out of their respective slots 102 and the first and second body portions 12 and 14 are separated, thereby releasing the rivets 22.

To facilitate the desired manual pivoting of the first and second body portions 12 and 14 with respect to one another, the first and second body portions include respective manual operating means in the form of gripping tabs 108 and 110. The gripping tabs 108 and 110 are formed integral with the respective body portions 12 and 14 and extend upward therefrom at the respective rear walls 28 and 34. The rear walls 28 and 34 include respective recesses 118 and 120 and the gripping tabs 108 and 110 reside within the respective recesses 118 and 120.

With reference to FIG. 11, fingers press inwardly on the tabs 108 and 110 (in the direction of the arrows) to effect t desired pivoting of the first and second body portions 12 and 14 with respect to one another. That is, upon the exertion of manual pressure to the gripping tabs 108 and 110, the first and second body portions 12 and 14 pivot with respect to one another about the co-axial pivot pins 100 until sufficiently pivoted that the pivot pins 100 slide out of their respective slots 102 to separate the first and second body portions 12 and 14, and thereby release the rivets 22.

As seen in FIGS. 1, 4, and 9–14, the gripping tabs 108 and 110 are angled outwardly. The angling of the tabs 108 and 110 is to minimize slippage of the fingers off the tabs upon initial pivoting, prior to separation of the first and second body portions 12 and 14. Tabs extending perpendicularly to the upper surfaces of the body portions would be angled inward toward one another upon initial pivoting and the fingers would tend to slip off the tabs. By angling the tabs 108 and 110 outwardly, there is considerably less likelihood of the fingers slipping off the tabs upon pivoting than with vertically extending tabs.

In brief summary, the rivet holder 10 of the preferred embodiment is assembled by engaging the pivot pins 100 within the slots 102, and supporting rivets 22 within the apertures 20a-e. In this initial stage, the first and second body portions 12 and 14 are generally co-planar. The rivet holder 10, with the group of rivets 22 supported therein, may then be picked up, with the rivets 22 thereby picked up as a group and inserted as a group into desired rivet-receiving apertures, such as the vertical passageways 96 of a rivet guide block as shown in FIGS. 5, 6 and 8. Thereafter, by pressing inwardly on the gripping tabs 108 and 110, the first and second body portions 12 and 14 are pivoted with respect to one another about the pivot pins 100. Upon sufficient pivoting, the pins 100 slide out of the slots 102 to separate the first and second body portions 12 and 14 from one another. Upon separation of the first and second body portions 12 and 14, the rivets 22 are released as a group for free standing within the rivet-receiving apertures in which they were inserted. The first and second body portions 12 and 14 of the rivet holder 10 then fall to the floor. The low production cost of the rivet holder 10 of the present invention allows for the body portions 12 and 14 to be disposed of following separation from the rivets 22. The body portions 12 and 14 may be made hollow in portions thereof to minimize material usage and further minimize production costs. Alternatively, the body portions 12 and 14 can be picked up and reassembled for use in subsequent operations.

While the preferred releasable means for the invention comprises the aforementioned pin-in-slot arrangement, with the first and second body portions 12 and 14 pivoting with respect to one another, other releasable means may also be employed.

One alternative embodiment of the rivet holder of the present invention is illustrated in FIGS. 15-20. The overall configuration of the alternative embodiment rivet holder 200 is generally the same as that of the preferred embodiment and, hence, only the differences between the preferred embodiment of the rivet holder 10 and the alternative embodiment rivet holder 200 will be discussed. In contrast with the pin-in-slot releasable means of the preferred embodiment, the releasable means of the alternative embodiment comprises ribbed or threaded pins 202 extending from the first body portion 204 which are received in circular holes 206 formed in the second body portion 208.

Figure 16:
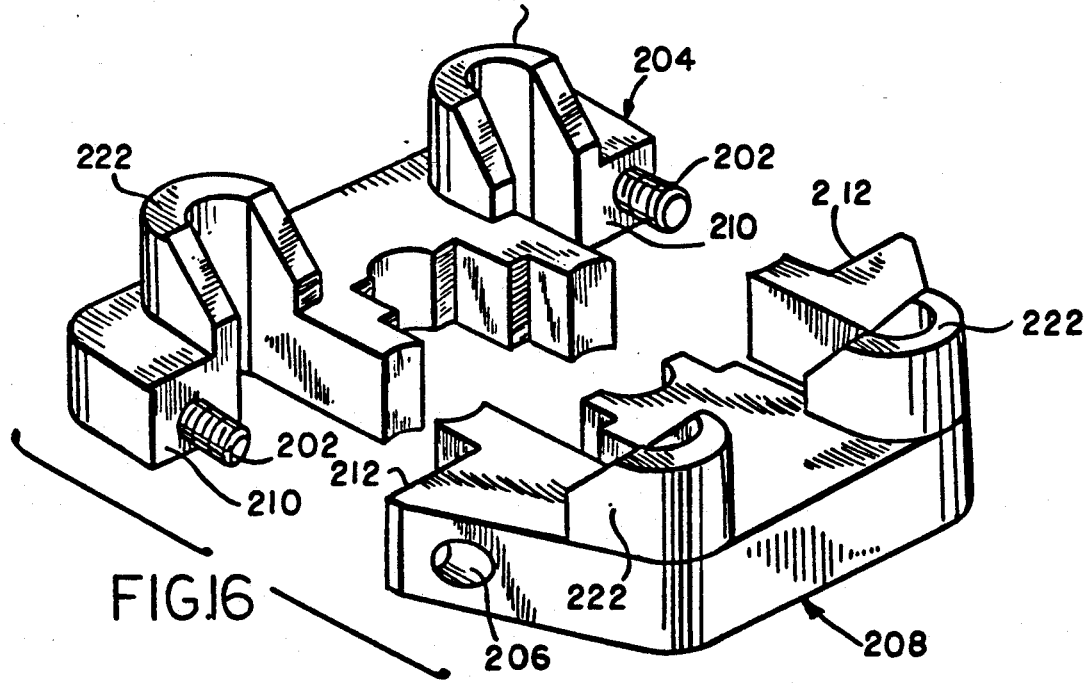
FIG. 16 is an exploded view of the alternate embodiment rivet holder of FIG. 15.
Figure 17:
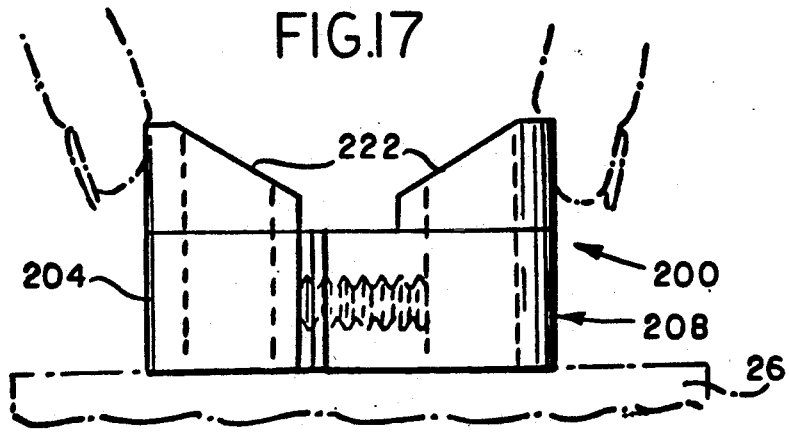
FIG. 17 is a side elevational view of the alternate embodiment rivet holder of FIG. 15.

As best seen in FIG. 16, the pins 202 extend horizontally forward from the forward wall 210 of the first body portion 204 at opposite lateral sides thereof. The circular holes 206 extend inward from the forward wall 212 of the second body portion 208, also at opposite lateral sides of the second body portion 208. The holes extend into the second body portion 208 to a depth equal to or greater than the length which the pins 202 extend from the forward wall 210. In the illustrated embodiment, the holes 206 extend completely through the second body portion 208, although this is not necessary in order to carry out the invention.

The ribbed pins 202 and holes 206 are proportioned so that the pins 202 are receivable within the holes 206 with the ribbing or threading of the pins 202 securing engagement of the pins 202 within the holes 206 such that only with a sufficient separating force urging the first and second body portions 202 and 208 apart will the pins 202 slide out from the holes 206.

Thus, in assembling the rivet holder 200 of the alternative embodiment, the first and second body portions 204 and 208 are brought together with the pair of pins 202 being slidably received within the holes 208. Rivets are maintained secured within respective apertures 220, in the manner discussed above with respect to the preferred embodiment, until the first and second body portions 204 and 208 are separated from one another, whereupon the rivets are released. The separation of the first and second body portions 204 and 208 is preferably attained by driving the rivets 22, such as by a hammer blow, with the force of the rivet head angled portion wedging the body portions 204 and 208 apart. Alternatively, the first and second body portions 204 and 208, may be simply gripped and pulled in opposite directions to slide the pins 202 out from the holes 206.

The ribbing or threading of the pins 202 bearing against the internal walls of the holes 206 provides resistance to sliding of the pins 202 from the holes 206. This is to prevent slippage of the pins from the holes prematurely, prior to the time of intended use, under the influence of the rivets urging the first and second body portions 204 and 208 apart.

This rivet holder embodiment is not preferred because it is significantly more prone to premature separation than the pin-in-slot arrangement of the preferred embodiment. With the releasable means 16 of the preferred embodiment, the separating forces which may be encountered during transport of the rivet holder 200 or the like, which forces tend to push the first and second body portions 12 and 14 apart, the pin-in-slot arrangement prevents the first and second body portions from separating despite this separating force until the first and second body portions have been pivoted sufficiently. Since the pivoting of the body portions 12 and 14 is unlikely to occur absent the intentional application of manual pressure to the tabs 108 and 110, the body portions 12 and 14 remain interengaged and supporting rivets 22 therein until the intended time of use. However, since no pivoting is required to effect separation of the first and second body portions 204 and 208 of the alternative embodiment, there is a significantly greater likelihood of the first and second body portions 204 and 208 of the alternative embodiment becoming inadvertently separated prior to the time of intended use as compared with the rivet holder 10 of the preferred embodiment.

In addition to the difference between the releasable means of the preferred embodiment and the releasable means of the alternative embodiment, the alternative embodiment also differs from the preferred embodiment in that the rivet holder 200 of the alternative embodiment includes collars 222 which extend upward from the upper surfaces of the body sections, extending partially about the apertures 220. The collars 222 assist in maintaining the rivets in a vertical orientation and prevents the rivets from becoming askew while supported within the rivet holder. The collars 222 also serve to facilitate separation of the first and second body portions 204 and 208 when the rivets 22 are hit with a hammer. The force of the rivet heads 48 against the collars 222 exerts a separating force which urges the pins 202 out of the holes 206 to separate the first and second body portions 204 and 208.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. A snap-apart rivet holder for a plurality of rivets to be placed as a group in a belt fastener, said snap-apart rivet holder comprising:
   a body having first and second portions releasably joined together;
   said body having a plurality of apertures therein to receive and hold the rivets in a predetermined orientation and spacing;
   releasable means joining the first and second portions together when in a first position and movable to a second snapped-apart position releasing the rivets as a group in a belt fastener for being driven by a tool; and
   a manual operating means on the respective first and second portions for being operated by manual pressure to separate the first and second portions from the rivets to release the group of rivets in the second position.

2. A snap-apart rivet holder in accordance with claim 1 wherein the first and second portions are joined at a parting line therebetween, the parting line defining a portion of the apertures with the parting line portions of the apertures moving away from each other with operation of the manual operating means to separate the first and second portions.

3. A snap-apart rivet holder in accordance with claim 1 wherein the releasable means joining the first and second portions comprises pivoted surfaces pivotally interconnecting the first and second portions for pivoting relative to each other with operation of the operating means.

4. An apparatus in accordance with claim 1 wherein the apertures are grouped, with a first set on one side of the parting line and another group on the other side of the parting line.

5. A rivet holding system for holding and aligning a plurality of rivets for driving through apertures in an upper belt fastener plate and through a belt and into apertures in a lower belt fastener plate, said rivet holding system comprising:
   rivet guide block means including a plurality of elongated, vertically extending passageways, each for receiving one of the rivets and for guiding the same in vertical movement into the apertures in the upper plate fasteners and through the belt to the apertures in the lower plate fastener;
   means for releasably supporting a plurality of rivets in a predetermined orientation and spacing, corresponding to the orientation and spacing of the passageways in the rivet guide block means, for group insertion of the rivets into the rivet guide block means, the releasable supporting means comprising:
   a body having first and second portions releasably joined together;
   the body having a plurality of apertures therein to receive and hold the rivets in a predetermined orientation and spacing; and
   releasable means joining the first and second portions together when in a first position and movable to a second snapped-apart position releasing the rivets as a group in the rivet guide block means for being driven by a tool.

6. A device for supporting a plurality of rivets in a predetermined arrangement for group insertion into a plurality of apertures in a belt fastener, the device comprising:
   a first component having a first non-planar supporting surface of predetermined contour;
   a second component having a second non-planar supporting surface of predetermined contour such that, when adjacent one another, said first supporting surface and said second supporting surface define a plurality of non-coplanar apertures along their interface for receiving and supporting said rivets therein;
   engaging means for maintaining engagement of said first component with said second component to maintain said first supporting surface adjacent said second supporting surface, said engaging means having means for manually disengaging said first and second components following insertion of said plurality of rivets into said plurality of belt fastener apertures.

7. A device for releasably supporting a plurality of rivets in a predetermined arrangement for group insertion into a plurality of apertures in a belt fastener, the device comprising:
   a first component having a first vertical supporting surface and having an upper and lower surface and having a pair of laterally extending engaging pins;
   a second component having a second vertical supporting surface and having an upper surface and a lower surface, with a pair of vertically extending slots extending from said upper surface for engageably receiving said pair of first component pins to pivotally interconnect said first and second components in a substantially coplanar relation, said slots being defined by opposing vertically extending sidewalls;
   said first supporting surface and said second supporting surface being adjacent one another when said first and second component are interconnected, with said first supporting surface and said second supporting surface defining a plurality of apertures at their interface with the first and second supporting surfaces engageably receiving and supporting said plurality of rivets thereat;
   said first component and said second component being biased apart by the force of said rivets bearing against said first and second supporting surfaces; and
   said first component engaging pins bearing against said second component vertical slot sidewalls while said first component and said second component are substantially coplanar to retain the pins within the slots and thereby maintain interconnection of said first component and said second component; the pins being slidably releasably from said slots upon pivoting of said first and second components with respect to one another into a substantially non-coplanar relation to disengage said rivets.

8. A device for supporting a plurality of rivets in a predetermined arrangement, the device comprising:
   a first integral component having a pair of pins extending inwardly from opposite ends thereof, and further having an upper and lower surface;
   a second integral component having pin-receiving slots extending inwardly from opposite ends thereof for receiving said pins of said first component to pivotally interconnect said first and second components, and further having an upper surface and a lower surface;

said pivotally interconnected first and second components defining a non-planar interface therebetween with a plurality of non-coplanar apertures being defined along the interface for receiving said rivets;

said pin-receiving slits extending to said upper surface to allow said pins to be slidably disengaged from said slots through the opening in the upper surface upon sufficient pivoting of said first and second components relative to one another, by sliding of the pins through the opening at the upper surface, to release said rivets.

9. A device for supporting a plurality of rivets in a predetermined arrangement, comprising:

a first component having a forward side, rearward side, outer side and inner side, with pins extending inwardly from said forward and rearward sides;

a second component having a forward side, rearward side, outer side and inner side, with pin-receiving slots at said forward and rearward sides extending to said upper side;

said first component being pivotally interconnected to said second component by engagement of said pins within said pin-receiving slots, whereby upon engagement of said first and second components said inner sides thereof define a non-coplanar interface having a plurality of non-coplanar annular apertures for receiving said rivets therein;

said rivets bearing against said inner sides of said first component and said second component to bias said first component and said second component away from one another, the components remaining interconnected by said pins bearing against the inner surface of said slots; and said pins being slidably disengageable from said slots upon manual pivoting of said first component and said second component with respect to one another.

10. A device for supporting a plurality of rivets in a predetermined arrangement, said device comprising:

a first component having a first non-planar supporting surface;

a second component having a second non-planar supporting surface;

engaging means for maintaining engagement of said first component with said second component, said engaging means having means for disengaging said first and second components upon pivoting of said first component and said second component relative to one another a predetermined amount;

said first supporting surface and said second supporting surface being adjacent one another during engagement of said first and second components, with a plurality of apertures being defined at the interface of said first and second components for receiving and supporting said rivets; and said rivets being released upon separation of said first component and said second component as effected by said pivoting thereof.

11. An apparatus for holding and aligning a plurality of rivets for driving through apertures in an upper belt fastener plate and through a belt and into apertures in a lower belt fastener plate, said apparatus comprising:

rivet guide block means including a plurality of elongated, vertically extending passageways, each for receiving one of said rivets and for guiding the same in vertical movement into the apertures in the upper plate fasteners and through the belt to the apertures in the lower plate fastener; and means for releasably supporting a plurality of rivets in a predetermined arrangement corresponding to the arrangement of said apertures in said upper belt fastener plate for group insertion of said rivets into said rivet guide block means, the releasable supporting means comprising:

a first component having a first non-planar supporting surface;

a second component having a second non-planar supporting surface;

engaging means for maintaining engagement of said first component with said second component, said engaging means having means for disengaging said first and second components following insertion o said rivets into said rivet guide block means passageway;

said first supporting surface and said second supporting surface being adjacent one another during engagement of said first and second components, with a plurality of apertures being defined at the interface of said first and second components for receiving and supporting said rivets therein; and said rivets being released upon disengagement of said first component and said second component for free standing within the rivet guide block means passageways.

* * * * *

UNITED STATES PATENT AND TRADEMARK OFFICE
CERTIFICATE OF CORRECTION

PATENT NO. : 5,244,088
DATED : September 14, 1993
INVENTOR(S) : Musil

It is certified that error appears in the above-identified patent and that said Letters Patent is hereby corrected as shown below:

Column 2, line 10, change "w" to --with--.

Column 3, line 57, after "embodiment" insert --of--.

Column 8, line 31, change "move" to --moved--.

Column 9, line 50, after "100" delete "are".

Column 10, line 51, change "t" to --the--.

Column 14, line 56, change "releasably" to --releasable--.

Column 15, line 8, change "slits" to --slots--.

UNITED STATES PATENT AND TRADEMARK OFFICE
CERTIFICATE OF CORRECTION

PATENT NO. : 5,244,088

DATED : September 14, 1993

INVENTOR(S) : Musil

It is certified that error appears in the above-indentified patent and that said Letters Patent is hereby corrected as shown below:

Column 16, line 36, change "o" to --of--.

Signed and Sealed this

Fifth Day of April, 1994

Attest:

BRUCE LEHMAN

*Attesting Officer*     *Commissioner of Patents and Trademarks*